United States Patent [19]
Brooks et al.

[11] Patent Number: 6,038,606
[45] Date of Patent: Mar. 14, 2000

[54] METHOD AND APPARATUS FOR SCHEDULING PACKET ACKNOWLEDGEMENTS

[75] Inventors: David Paul Brooks, Durham; Edward Glen Britton, Chapel Hill; Karen M. Tracey, Apex, all of N.C.

[73] Assignee: International Business Machines Corp., Armonk, N.Y.

[21] Appl. No.: 08/978,698

[22] Filed: Nov. 25, 1997

[51] Int. Cl.$^7$ ...................................................... H04J 3/14
[52] U.S. Cl. ........................... 709/235; 370/229; 374/241
[58] Field of Search ....................... 340/825.54; 370/473, 370/394, 231, 428, 229, 241; 709/235

[56] References Cited

U.S. PATENT DOCUMENTS

| | | | |
|---|---|---|---|
| 4,646,082 | 2/1987 | Engel et al. ........................ | 340/825.54 |
| 5,042,029 | 8/1991 | Hayakawa ............................... | 370/231 |
| 5,245,616 | 9/1993 | Olson ...................................... | 370/394 |
| 5,432,787 | 7/1995 | Chethik .................................. | 370/473 |

OTHER PUBLICATIONS

Electronics and Communications in Japan, Part 1, vol. 77, No. 9, 1994 "Evaluation of Acknowledgement Methods for High–Speed Data Transmission", by Tadao Saito, Hitoshi Aida, Tadahiro Tomiyama, and Hong Fu, members of Faculty of Engineering, The University of Tokyo.

Tadao Saito et al. Evaluation of Acknowledgement Methods for High–Speed Data Transmission, Feb. 1993.

*Primary Examiner*—Glenton B. Burgess
*Assistant Examiner*—Chuong Ho
*Attorney, Agent, or Firm*—Jerry W. Herndon

[57] ABSTRACT

Method and apparatus for returning packet acknowledgements from a packet receiving node to a packet sending node of a packet network. During a predefined initial startup phase of a packet connection between the sending and receiving nodes, an acknowledgement is returned to the sending node for every group of X packets received from the sending node. After the expiration of the initial startup phase, an acknowledgement is returned for every W–N packets received from the sending node. W represents the maximum number of packets that can be in transit on the connection at any given time, N is an integer less than W. If packet congestion occurs, the algorithm reverts to returning an acknowledgement for every group of X packets.

24 Claims, 2 Drawing Sheets

Fig. 1
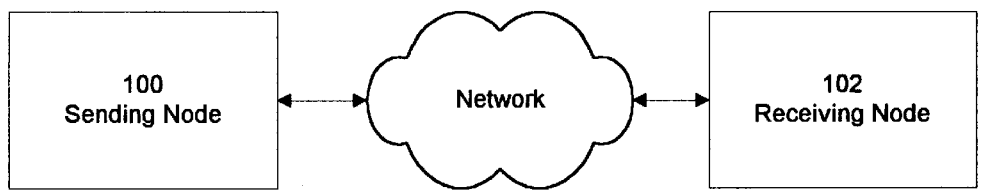
Fig. 2 - Prior Art
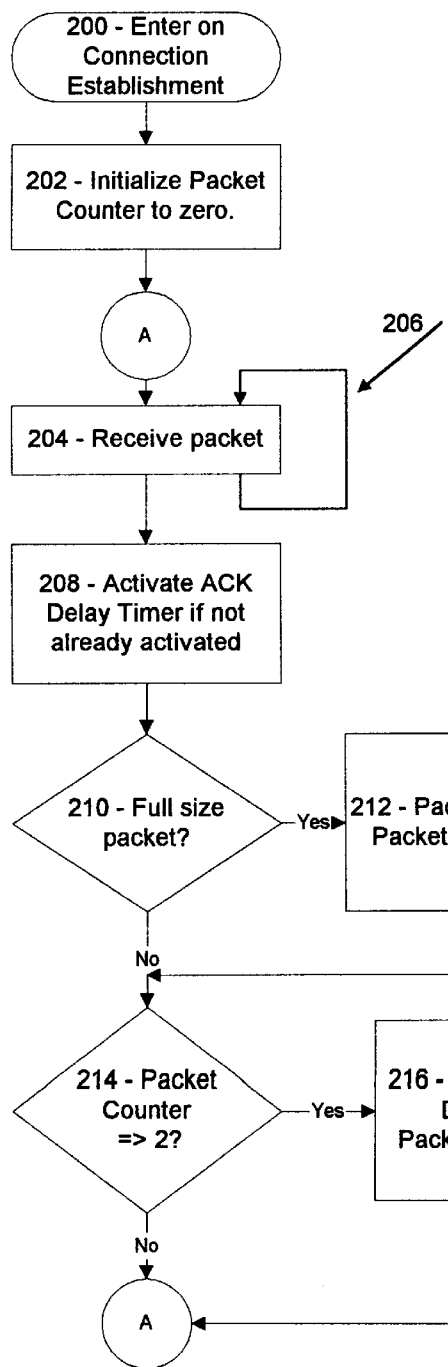
Fig. 3 - Prior Art
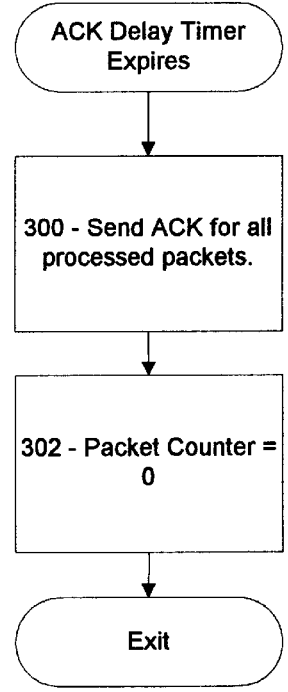

METHOD AND APPARATUS FOR SCHEDULING PACKET ACKNOWLEDGEMENTS

TECHNICAL FIELD

The invention relates to the field of networking in general and, in particular, to algorithms for acknowledging packets in networks in a manner to improve transmission efficiency while at the same time improving processor usage as a result of acknowledgement processing.

BACKGROUND OF THE INVENTION

It is known in communications networks to acknowledge to packet sending nodes the receipt of packets by a packet receiving node. For example, one common algorithm is to acknowledge each packet as it is received at a node. With respect to the Internet and TCP/IP networks in general, at the present time RFC 1122, which document governs much of the TCP/IP protocol, states:

"A host that is receiving a stream of TCP data segments can increase efficiency in both the Internet and the hosts by sending fewer than one ACK (acknowledgement) segment per data segment received; this is known as a delayed ACK . . . "

"A TCP should implement a delayed ACK, but an ACK should not be excessively delayed; in particular, the delay must be less than 0.5 seconds, and in a stream of full-sized segments there should be an ACK for at least every second segment."

RFC 1122 adopts the term segment or data segment. The term "packet" is used instead herein, as it appears to be a more commonly recognized terminology. As an implementation of the above RFC 1122 statement, the present TCP/IP and Internet standard is to acknowledge every second full-sized packet and to rely on packet timeouts to acknowledge partial size packets. These packet timeouts are typically set at 150 to 200 milliseconds and are thus well within the 0.5 second criterion. FIGS. 1 and 2 of the drawing illustrate this prior art implementation and will be discussed in somewhat more detail below.

In their paper "Evaluation of Acknowledgement Methods for High-Speed Data Transmission", Electronics and Communications in Japan, Part 1, Vol. 77, No. 9, 1994; Saito et al recognize a relationship between end to end transmission efficiency, transmission rate, propagation delay, protocol processing time in the network nodes, window size and response interval. Response interval is defined as the number of packets received before an acknowledgement is returned. They recognize that known acknowledgement algorithms include returning an acknowledgement for various numbers of received packets. They derive formulas for selecting a minimum value for the window size, and a maximum value for the protocol processing time required by the processing nodes, given some desired value of transmission efficiency and some maximum value for the response interval. Formula 37 on page 12, for example, is the relevant formula for TCP/IP networks. Saito et al appear to be attempting to optimize transmission efficiency in light of the remaining parameters that are analyzed in the paper. However, the paper does not consider the problem of enhancing transmission efficiency while at the same time improving processor utilization, for the invention described herein results in vastly different values selected as a response interval than Saito et al predict by their analysis, as will become apparent below.

Both the sender and the receiver in a packet connection consume a significant amount of processor cycles processing acknowledgements. However, packet throughput will decrease if the sender does not receive acknowledgements at a rate sufficient for it to keep a windows worth of packets in transit on the connection between it and the receiver. Furthermore, if the sender does not receive an acknowledgement before a timeout of the ACK delay timer, a retransmission of packets will become necessary. This also reduces packet throughput on the connection and increases the processor utilization in processing acknowledgements. The ideal acknowledgement algorithm for the purpose of maintaining transmission efficiency and reducing processor utilization will minimize the number of acknowledgments while assuring that the sender will receive an acknowledgement just in time to allow it to continue to send packets without interruption or retransmission. The present standard for TCP networks, which acknowledges every other packet, generates far more acknowledgements than are needed to maintain throughput on a connection and consumes considerable processor cycles in the process. Saito et al do not address this particular problem.

SUMMARY OF THE INVENTION

The invention is an improved method and apparatus for returning packet acknowledgements from a packet receiving node to a packet sending node of a packet network. During a predefined initial startup phase of a packet connection between the sending and receiving nodes, an acknowledgement is returned to the sending node for every group of X packets received from the sending node. After the expiration of the initial startup phase, an acknowledgement is returned for every W−N packets received from the sending node. W represents the maximum number of packets that can be in transit on the connection at any given time, N is an integer less than W. If packet congestion occurs on the connection after the startup phase, then the algorithm reverts to returning an acknowledgement to the sending node for every group of X packets, and preferably, this remains so for the remainder of the connection. In the preferred embodiment, congestion on the connection is detected at the receiving node by receiving a packet that is recognized as a retransmission. Tests indicate that the preferable value of N is two, but that values in the range of 1 to 3 may offer satisfactory performance depending on individual network characteristics.

BRIEF DESCRIPTION OF THE DRAWING

In the drawing,

FIG. 1 shows a simplified illustrative packet network useful for practicing the invention;

FIGS. 2 and 3, respectively, illustrate the present TCP algorithm for generating packet acknowledgements.

DETAILED DESCRIPTION

Figure 4:
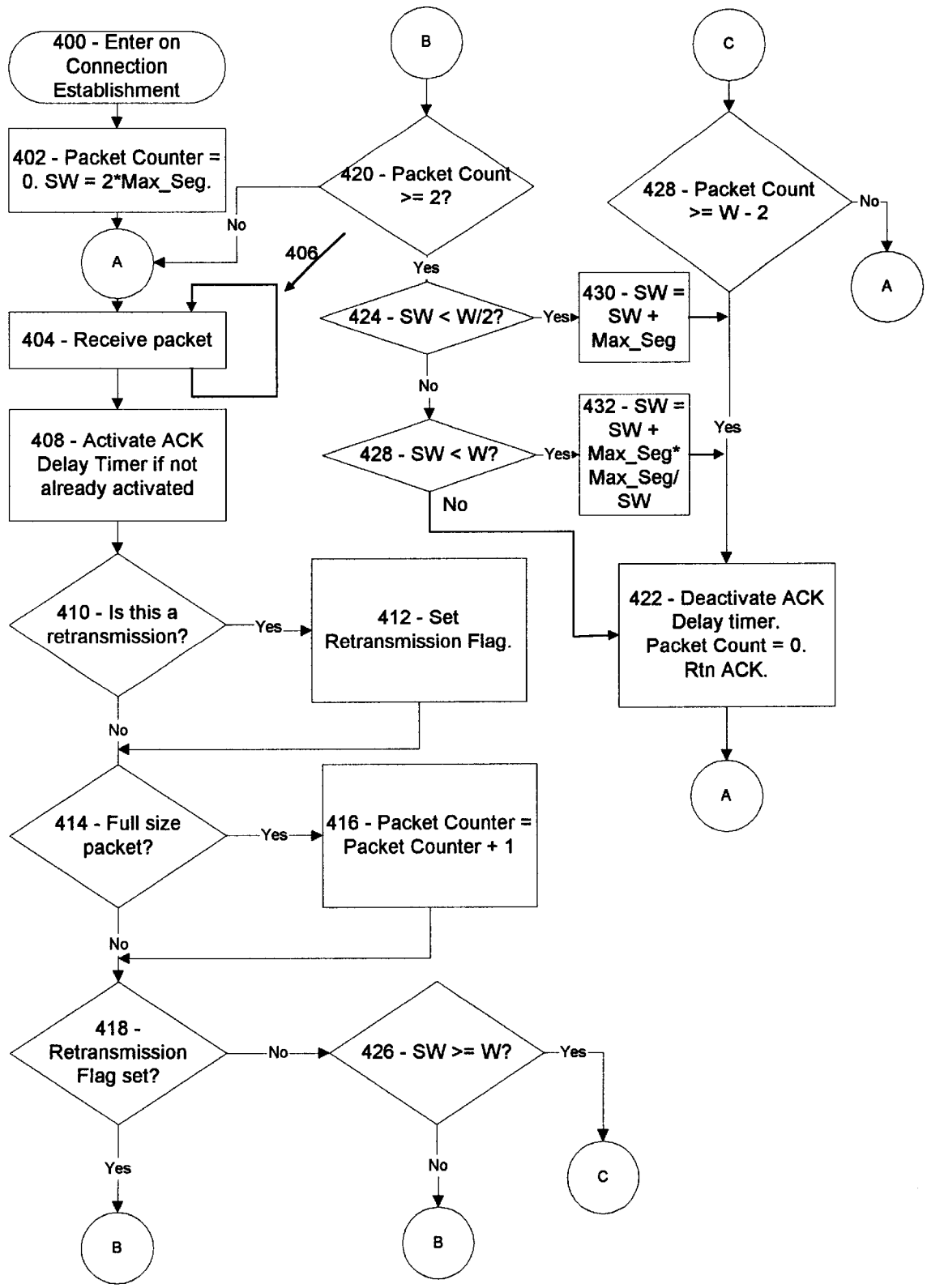
FIG. 4 shows an illustrative flowchart of the modifications to the TCP algorithm of FIGS. 1 and 2 according to the invention.

FIG. 1 shows an illustrative network for practicing the invention. This network consists of a packet sending node 100, a packet receiving node 102, and a connection there between over which packets are transmitted. By way of example, the connection is shown as consisting of a cloud of unknown links and intermediate nodes, which is typically the case in real situations, such as in Internet communications. In this network, node 100 is assumed to send packets over the connection to node 102, and node 102 returns acknowledgement packets to node 100 over the same connection according to a predetermined algorithm.

FIG. 2 shows the present acknowledgement algorithm used in TCP networks according to RFC 1122. The algorithm is entered at 200 upon the initial establishment of a connection with a sending node. As already summarized, the purpose of the algorithm is to acknowledge every two received full size packets and to rely on ACK delay timeouts to acknowledge partial size packets. To this end, step 202 initializes a Packet Counter to zero and step 204 effectively loops until a packet is received on the connection from the sending node. The loop at 206 is intended to suggest this looping process while waiting for a packet arrival. When a packet arrives, step 208 activates the ACK Delay Timer if it is not already activated. This timeout value of this timer is typically set by various implementations to timeout in 150 to 200 milliseconds, if not reset in the meantime when an acknowledgement is generated. Step 210 next determines if the new packet is a full sized one. If so, step 212 increments the Packet Counter by one. This step is omitted for a partial size packet. Step 214 next determines if the Packet Counter is equal to or greater than two. If the Packet Counter is zero or one, step 204 is again entered to receive the next packet. When two full size packets arrive, the Packet Counter will test equal to two at step 214 and, as a result, an acknowledgement of the two packets should be returned to the sending node. Step 216 deactivates the ACK Delay Timer; step 218 returns the acknowledgement and sets Packet Counter to zero. If partial size packets are being received (the Packet Counter is not being incremented), or if the delay between packets is excessive, the ACK Delay Timer will timeout and generate an entry to the timeout function illustrated in FIG. 3. Step 300 of FIG. 3 generates and returns an acknowledgement for all packets that have been received but are unacknowledged at this time. Step 302 resets the Packet Counter to zero and that ends the required function of the timeout function.

As discussed above, experience reveals that this acknowledgement algorithm is inefficient with respect to processor utilization in processing acknowledgements.

FIG. 4 shows an illustrative flowchart of modifications to FIG. 2 according to the invention to improve processor utilization while maintaining transmission efficiency over the connection. The gist of the invention is to return acknowledgements just in time to keep the sender from interrupting packet transmission, while avoiding retransmissions caused by ACK timer delay timeouts. Preferably, though not required in all networks that might practice the invention, the acknowledgement algorithm follows a conservative approach during an initial startup phase of a connection and, in the event that a packet loss is encountered after the inventive algorithm is operating, the algorithm reverts back to the prior art acknowledgement of FIG. 2 for the remaining life of the connection. Obviously, many variations as to when and if reversion to the prior art scheme are possible. Thus, in the invention, once the initial startup phase, if any, is completed, the acknowledgement interval then becomes related to the connection window size; further, the value chosen for the ACK timeout interval should be large enough that the ACK timeout does not expire under normal circumstances, such as when there is no network congestion and no packet loss.

FIG. 4, which illustrates one embodiment of the inventive algorithm, is entered at 400 at a receiving node upon the establishment of a connection. Step 402 initializes a Packet Counter to zero. Because two packets have already been exchanged in the handshaking process involved in setting up the connection, a variable SW (Send Window) is also initialized to two times the maximum segment (packet) count (Max_Seg) in effect on this connection. Max_Seg is the maximum size of a packet in bytes, which was negotiated conventionally for the connection during the setup phase just before connection establishment. The variable SW is used by the receiver to determine when the sender has completed the initial startup phase of the connection. As in the prior art algorithm of FIG. 1, the Packet Counter is used to count full size packets. Assuming that the network of FIG. 1 is a TCP network, such networks use what is commonly called the slow start algorithm during the initial startup phase of the connection to guard against packet congestion. In the TCP slow start algorithm, as acknowledgements are received by the sender from the receiver, the congestion window of the sender is doubled with each received acknowledgement, until half of the negotiated full window size of the connection is reached. After this point, the congestion window is increased by a fraction of one full packet size with each received acknowledgement until the full window size is reached. When the full window size is reached, slow start is complete. In the illustrative embodiment of FIG. 4, the data receiver emulates this slow start algorithm to determine when the sender completes slow start. Preferably the prior art acknowledgement algorithm of FIG. 1 is used in the startup phase or slow start phase. This is discussed in more detail below.

At step 404, the algorithm loops waiting for the receipt of a packet as indicated by 406. When a packet is received, step 408 activates the ACK Delay Timer if it is not already activated. Step 410 next determines if this packet is a retransmission. This is accomplished in a conventional way by examining the sequence number associated with the packet. If this is a retransmitted packet, step 412 sets a Retransmission Flag, which is eventually used to revert to the prior art acknowledgement algorithm of FIG. 1. Assuming that this packet is not a retransmission, step 414 next determines if this is a full size packet. If so, then step 416 increments the Packet Counter by one. It should be apparent that packet count can be based on bytes received or on packets, partial or full or perhaps on other criterion. Because the TCP protocol discourages partial size packets by relying on ACK delay timeout to acknowledge them, the preferred embodiment here preserves this policy. However, it is intended that "packet" be interpreted broadly in the claims to encompass all possible ways of defining a "packet" that otherwise fall within the spirit and scope of the invention. Step 418 next queries the Retransmission Flag and, if set, goes to step 420. This effectively institutes the prior art acknowledgement algorithm of FIG. 1 for this illustrative TCP embodiment, in which an acknowledgement is returned for every two received packets. Thus, step 420 examines the Packet Counter and if equal to or greater than two, executes step 422 to return an acknowledgement, deactivate the ACK delay timer and re-initialize the Packet Counter. The Retransmission Flag remains set which causes step 418 to maintain this conservative acknowledgement algorithm in effect for the remaining duration of the connection.

At step 418, if the Retransmission Flag is not set, step 426 next determines if the data sender is yet out of slow-start by testing variable SW for a value greater that the connection window size. At this point, SW is equal to the value 2*Max_Seg, which was set at step 402. This is considerably below any window size which will be in effect. Thus, step 426 goes to step 420 at this point. Step 420 determines if two unacknowledged packets have now been received. If not, step 404 is entered to wait for the arrival of a new packet.

If two packets have been received, step 420 goes to step 424. At this point, the algorithm determines if slow start is complete or, if not, the variable SW is updated to follow slow start synchronization with the sender. Step 424 determines if SW is less than one half of the window size. At this point in the algorithm, it will be and step 430 increments SW by Max_Seg to stay in sync with the sender. Next, step 422 deactivates the ACK Delay timer, re-initializes the packet Counter to zero and returns an acknowledgement to the sender. Step 404 is next entered to wait for a new packet.

As packets are received and acknowledged, eventually, the variable SW will exceed one half the window size of the connection and step 428 will be executed. If SW is less than the full connection window size, the sender slow start algorithm is still in effect, but it is in its second half in which the sender increases its congestion window more slowly until the full window size is reached. During this second half of slow start, step 432 increments SW by (Max_Seg)*(Max_Seg)/SW to remain in sync during this second half of slow start.

When the sender slow start algorithm is complete, SW should also be equal to W, the connection window size). Therefore, when slow start is complete, step 426 begins to execute step 428. This marks the beginning of returning acknowledgements according to the invention to reduce processor time. Heuristics have shown that to reduce processor acknowledgement processing time and still avoid ACK delay timer timeouts, an acknowledgement should be returned at less than, but close to a window's worth of packets. Tests indicate that satisfactory performance may be obtained, depending on the particular network in question, with an acknowledgement return in the range of W−X, where W is the window size in packets and X is an integer less that W, and preferably in the range of one to three. In the disclosed embodiment, X is set to two. Therefore, step 428 tests for Packet Counter equal or greater than W−2 and if this is true, an acknowledgement is returned at step 422; the ACK delay timer is also deactivated and the Packet Counter is reset to zero. Otherwise, an acknowledgement is not yet generated and step 404 is entered to receive the next packet. Thus, according to the invention, during the slow start initial startup phase of the illustrative TCP network, acknowledgements are returned at the prior rate of one for every two received full size packets. When the slow start initial phase is complete, acknowledgements are returned for every W−2 full size packets. The processor time required to process acknowledgements is considerably less than that required by the prior art and experience shows that ACK Delay timeouts are not triggered as a result of the new algorithm.

It is to be understood that the above described arrangements are merely illustrative of the application of principles of the invention and that other arrangements may be devised by workers skilled in the art without departing from the spirit and scope of the invention.

What is claimed:

1. A method of returning packet acknowledgements from a packet receiving node to a packet sending node of a packet network, said method comprising the steps of during a predefined initial startup phase of a packet connection between the sending and receiving nodes, returning an acknowledgement to the sending node for every group of X packets received from the sending node, after the expiration of the initial startup phase, counting the number P of received packets, and calculating the expression A=W−N and returning an acknowledgement if A=P, where W represents the maximum number of packets that can be in transit on the connection at any given time and N is an integer less than W.

2. The method of claim 1 further comprising the step of detecting packet congestion on the connection, and in response thereto, reverting to the step of returning an acknowledgement to the sending node for every group of X packets received from the sending node for a prescribed period.

3. The method of claim 2 wherein the prescribed period is the remaining duration of the connection.

4. The method of claim 2 or claim 3 wherein the step of detecting packet congestion on the connection further comprises detecting at the receiving node the retransmission of a packet.

5. The method of claim 1 or claim 2 or claim 3 wherein N is in the range of 1 to 3.

6. The method of claim 1 or claim 2 or claim 3 further comprising the step of detecting the expiration of the initial startup phase by emulating at the receiver the same slow start algorithm as that used by the sending node.

7. Apparatus for returning packet acknowledgements from a packet receiving node to a packet sending node of a packet network, comprising means for counting the number P of received packets, means operative during a predefined initial startup phase of a packet connection between the sending and receiving nodes for returning an acknowledgement to the sending node for every group of X packets received from the sending node, means operative after the expiration of the initial startup phase for calculating the expression A=W−N and for returning an acknowledgement if A=P, where W represents the maximum number of packets that can be in transit on the connection at any given time and N is an integer less than W.

8. The apparatus of claim 7 further comprising means for detecting packet congestion on the connection, means responsive to the detecting means for reverting to the step of returning an acknowledgement to the sending node for every group of X packets received from the sending node for a prescribed period.

9. The apparatus of claim 8 wherein the prescribed period is the remaining duration of the connection.

10. The apparatus of claim 8 or claim 9 wherein the means for detecting packet congestion on the connection further comprises means for detecting at the receiving node the retransmission of a packet.

11. The apparatus of claim 7 or claim 8 or claim 9 wherein N is in the range of 1 to 3.

12. The apparatus of claim 7 or claim 8 or claim 9 further comprising means for emulating at the receiver the same slow start algorithm as that used by the sending node to detect the expiration of the initial startup phase.

13. A computer program product for returning packet acknowledgements from a packet receiving node to a packet sending node of a packet network, the computer program product comprising a computer-readable medium having computer-readable program code means embodied in the medium, the computer-readable program code means comprising computer-readable program code means for counting the number P of received packets, computer-readable program code means for returning an acknowledgement to the sending node for every group of X packets received from the sending node during a predefined initial startup phase of a packet connection between the sending and receiving nodes, and computer-readable program code means operative after the expiration of the initial startup phase for calculating the expression A=W−N and for returning an acknowledgement if A=P, where W represents the maximum number of packets that can be in transit on the connection at any given time and N is an integer less than W.

14. The computer program product of claim 13 further comprising computer-readable program code means for detecting packet congestion on the connection, computer-readable program code means responsive to the detecting means for reverting to the step of returning an acknowledgement to the sending node for every group of X packets received from the sending node for a prescribed period.

15. The computer program product of claim 14 wherein the prescribed period is the remaining duration of the connection.

16. The computer program product of claim 14 or claim 15 wherein the computer-readable program code means for detecting packet congestion on the connection further comprises computer-readable program code means for detecting at the receiving node the retransmission of a packet.

17. The computer program product of claim 13 or claim 14 or claim 15 wherein N is in the range of 1 to 3.

18. The computer program product of claim 13 or claim 14 or claim 15 further comprising computer-readable program code means for detecting the expiration of the initial startup phase by emulating at the receiver the same slow start algorithm as that used by the sending node.

19. A data signal embodied in a carrier wave containing computer readable program code for returning packet acknowledgements from a packet receiving node to a packet sending node of a packet network, the product code comprising a code segment for counting the number P of received packets, a code segment for returning an acknowledgement to the sending node for every group of X packets received from the sending node during a predefined initial startup phase of a packet connection between the sending and receiving nodes, and a code segment operative after the expiration of the initial startup phase for calculating the expression A=W−N and for returning an acknowledgement if A=P, where W represents the maximum number of packets that can be in transit on the connection at any given time and N is an integer less than W.

20. The data signal of claim 19 further comprising a code segment for detecting packet congestion on the connection, a code segment responsive to the detecting code segment for reverting to returning an acknowledgement to the sending node for every group of X packets received from the sending node for a prescribed period.

21. The data signal of claim 20 wherein the prescribed period is the remaining duration of the connection.

22. The data signal of claim 20 or claim 21 wherein the code segment for detecting packet congestion on the connection further comprises a code segment for detecting at the receiving node the retransmission of a packet.

23. The data signal of claim 19 or claim 20 or claim 21 wherein N is in the range of 1 to 3.

24. The data signal of claim 19 or claim 20 or claim 21 further comprising a code segment for detecting the expiration of the initial startup phase by emulating at the receiver the same slow start algorithm as that used by the sending node.

* * * * *